US012775145B2

(12) United States Patent
Gu et al.

(10) Patent No.: US 12,775,145 B2
(45) Date of Patent: Oct. 27, 2026

(54) OPTICAL FIBER SPLICE CLOSURE

(71) Applicant: ACCELIGHT TECHNOLOGIES (WUHAN) CO., LTD., Wuhan (CN)

(72) Inventors: Gong-En Gu, Wuhan (CN); Matthew John Steven Rouleau, Wuhan (CN); Neil Santos, Wuhan (CN); William Sterling, Wuhan (CN); Hengzhi Fan, Wuhan (CN); Wenbing Zhu, Wuhan (CN); Zhehuanyan Mei, Wuhan (CN); Fei Li, Wuhan (CN)

(73) Assignee: ACCELIGHT TECHNOLOGIES (WUHAN) CO., LTD., Wuhan (CN)

(*) Notice: Subject to any disclaimer, the term of this patent is extended or adjusted under 35 U.S.C. 154(b) by 309 days.

(21) Appl. No.: 18/629,131

(22) Filed: Apr. 8, 2024

(65) Prior Publication Data

US 2024/0255721 A1 Aug. 1, 2024

Related U.S. Application Data

(63) Continuation of application No. PCT/CN2023/117949, filed on Sep. 11, 2023.

(30) Foreign Application Priority Data

Nov. 26, 2022 (CN) ......................... 202223146771.0

(51) Int. Cl.
*G02B 6/44* (2006.01)
*H02G 15/013* (2006.01)

(52) U.S. Cl.
CPC ....... *G02B 6/4444* (2013.01); *G02B 6/44465* (2023.05); *G02B 6/44775* (2023.05); *H02G 15/013* (2013.01)

(58) Field of Classification Search
CPC ........................... G02B 6/4442; G02B 6/4444; G02B 6/44465; G02B 6/44775; H02G 3/083; H02G 15/013; H02G 15/115
See application file for complete search history.

(56) References Cited

U.S. PATENT DOCUMENTS 7,038,137 B2 * 5/2006 Grubish ............... H02G 15/013 174/93
2006/0042814 A1 * 3/2006 Ball ..................... H02G 15/013 174/650

(Continued)

FOREIGN PATENT DOCUMENTS

CN 2769908 Y 4/2006
CN 2929747 Y 8/2007

(Continued)

OTHER PUBLICATIONS

English translation of written opinion for PCT/CN2023/117949, dated Jan. 8, 2024. (Year: 2024).*

(Continued)

*Primary Examiner* — Michael Stahl
(74) *Attorney, Agent, or Firm* — Troutman Pepper Locke LLP; Tim Tingkang Xia, Esq.

(57) ABSTRACT

The disclosure provides an optical fiber splice closure including a closure cap and a base. The base includes an end cover and a sealing component, the end cover and the closure cap are connected to form a sealed cavity, an installation groove is formed in the end cover, a through hole communicating with the sealed cavity is formed in a bottom of the installation groove, the sealing component includes a sealing piece, a separator and an installation piece, the sealing piece includes a first pressing piece, a sealing block and a second pressing piece provided with first, second and third installation holes, respectively, which communicate with one another in sequence to form an optical cable hole, (Continued)

optical cables penetrate through the optical cable hole and the through hole and enter the sealed cavity, the separator is arranged in the optical cable hole to separate the optical cables from one another.

9 Claims, 11 Drawing Sheets

(56) References Cited

U.S. PATENT DOCUMENTS

| | | | | |
|---|---|---|---|---|
| 2007/0007038 | A1* | 1/2007 | Cox | H02G 15/013 174/650 |
| 2012/0297574 | A1* | 11/2012 | Payne | H02G 15/013 16/2.5 |
| 2013/0014974 | A1* | 1/2013 | Burke | G02B 6/44775 174/135 |
| 2015/0345668 | A1* | 12/2015 | Blaser | F16L 5/02 277/606 |
| 2020/0249407 | A1* | 8/2020 | Aznag | G02B 6/44465 |
| 2023/0045054 | A1* | 2/2023 | Paddick | G02B 6/4444 |
| 2024/0255720 | A1* | 8/2024 | Fan | G02B 6/44 |

FOREIGN PATENT DOCUMENTS

| | | | | |
|---|---|---|---|---|
| CN | 201527505 | U | | 7/2010 |
| CN | 201955523 | U | | 8/2011 |
| CN | 102841421 | A | | 12/2012 |
| CN | 202583557 | U | | 12/2012 |
| CN | 204229022 | U | | 3/2015 |
| CN | 213457466 | U | * | 6/2021 |
| CN | 113703109 | A | * | 11/2021 |
| CN | 114415304 | A | | 4/2022 |
| DE | 102019125758 | A | * | 3/2021 |
| EP | 4459343 | A1 | * | 6/2024 |
| JP | 2000287324 | A | | 10/2000 |
| WO | WO 2023/142566 | A1 | * | 8/2023 |

OTHER PUBLICATIONS

International Search Report issued by the Chinese Intellectual Property Office for PCT/CN2023/117949, Aug. 1, 2024, China.

* cited by examiner

OPTICAL FIBER SPLICE CLOSURE

CROSS-REFERENCE TO RELATED APPLICATIONS

This application is a continuation application of PCT Patent Application Serial No. PCT/CN2023/117949, filed Sep. 11, 2023, which itself claims priority to Chinese patent application No. 202223146771.0, filed Nov. 26, 2022, which are hereby incorporated herein in their entireties by reference.

TECHNICAL FIELD

The present disclosure relates generally to the technical field of optical modules, and more particularly to an optical fiber splice closure.

BACKGROUND

Optical fiber splice closures are apparatuses that split optical cables into single optical fibers. The optical fiber splice closures are usually installed on walls, cables, power poles or sewers. The optical fiber splice closures are usually made of synthetic plastics and are widely used in communication, network systems, CATV cable televisions, optical cable network systems and the like. At present, the optical fiber splice closures have high waterproof and dustproof performance. However, the use environment of the optical fiber splice closures is complex, the existing waterproof and dustproof performance still cannot meet the requirements. Therefore, it is necessary to improve the existing optical fiber splice closures to improve the sealing performance of the optical fiber splice closures.

SUMMARY

An objective of the present disclosure is to provide an optical fiber splice closure, so as to solve a problem of poor sealing performance of an existing optical fiber splice closure.

In order to solve the above technical problem, the present disclosure provides an optical fiber splice closure, used for optical cable welding, and including a closure cap and a base. The base includes an end cover and a sealing component, the end cover and the closure cap are connected to form a sealed cavity, an installation groove is formed in the end cover, a through hole communicating with the sealed cavity is formed in a bottom of the installation groove, the sealing component includes a sealing piece, a separator and an installation piece, the sealing piece includes a first pressing piece, a sealing block and a second pressing piece, the first pressing piece, the sealing block and the second pressing piece are provided with a first installation hole, a second installation hole and a third installation hole respectively, the first installation hole, the second installation hole and the third installation hole communicate with one another in sequence to form an optical cable hole, a plurality of optical cables penetrate through the optical cable hole and the through hole and enter the sealed cavity, the separator is arranged in the optical cable hole and configured to separate the plurality of optical cables from one another, the sealing piece is arranged in the installation groove, the first pressing piece is in contact with the bottom of the installation groove, the installation piece located in the sealed cavity is configured to fix the sealing piece and the separator to the end cover, and a material of the sealing block is gel.

Optionally, the first pressing piece includes a first press sheet and a second press sheet, the sealing block includes a first sealing sheet and a second sealing sheet, the second pressing piece includes a third press sheet and a fourth press sheet, the first press sheet and the second press sheet are enclosed into the first installation hole, the first sealing sheet and the second sealing sheet are enclosed into the second installation hole, and the third press sheet and the fourth press sheet are enclosed into the third installation hole.

Optionally, a first limiting column and a second limiting column extend on two sides of the first sealing sheet, a third limiting column and a fourth limiting column extend on two sides of the second sealing sheet, a first fixing hole matched with the first limiting column is formed in the first press sheet, a second fixing hole matched with the second limiting column is formed in the third press sheet, a third fixing hole matched with the third limiting column is formed in the second press sheet, and a fourth fixing hole matched with the fourth limiting column is formed in the fourth press sheet.

Optionally, materials of the first pressing piece, the second pressing piece and the separator are plastics.

Optionally, a plurality of first installation holes, second installation holes and third installation holes are formed.

Optionally, the sealing piece further includes a plug, which is configured to block an optical cable hole through which no optical cable penetrates.

Optionally, the optical fiber splice closure further includes an anchor ear, a first flange is arranged on the closure cap, a second flange is arranged on the base, the anchor ear includes a first holding piece, a second holding piece, a buckle and a wrench, the first holding piece is hinged with the second holding piece, the first holding piece and the second holding piece are both in a semi-arc shape and have U-shaped cross sections, the U-shaped cross section of the first holding piece clamps the first flange and the second flange, the U-shaped cross section of the second holding piece clamps the first flange and the second flange, the wrench is rotatably connected with the first holding piece, the buckle is rotatably connected with one end, rotatably connected with the first holding piece, of the wrench, a locking protrusion is arranged on the second holding piece, after the buckle is arranged on the locking protrusion in a sleeving mode, the wrench is rotated to pull the second holding piece to be close to the first holding piece through the buckle, so that the first holding piece and the second holding piece are locked on the first flange and the second flange.

Optionally, the wrench is in an arc shape, and after the first holding piece and the second holding piece are locked, an inner side of the wrench is parallel to an outer side of the first holding piece.

Optionally, a limiting protrusion is further arranged on the first holding piece, a limiting hole is formed in the limiting protrusion, the wrench is provided with a structural hole, the anchor ear further includes a limiting pin, after the first holding piece and the second holding piece are locked, the limiting hole is aligned with the structural hole, and the limiting pin is inserted into the limiting hole and the structural hole.

The optical fiber splice closure provided by the present disclosure has the following beneficial effects:

since the sealing piece includes the first pressing piece, the sealing block and the second pressing piece, the first pressing piece, the sealing block and the second pressing piece are provided with the first installation hole, the second installation hole and the third installation hole respectively, the first installation hole, the second installation hole and the third installation hole communicate with one another in sequence to form the optical cable hole, the plurality of optical cables penetrate through the optical cable hole and the through hole and enter the sealed cavity, the separator is arranged in the optical cable hole and configured to separate the plurality of optical cables from one another, the sealing piece is located in the installation groove, the first pressing piece is in contact with the bottom of the installation groove, the installation piece located in the sealed cavity is configured to fix the sealing piece and the separator to the end cover, and the material of the sealing block is the gel, after the sealing piece is arranged in the installation groove, and the first pressing piece is in contact with the bottom of the installation groove, the sealing block may be pressed by the first pressing piece and the second pressing piece, so that the sealing block is deformed to fill a gap between the sealing piece and the installation groove and a gap between the optical cable and the separator, so that a better sealing effect is achieved. Since the plurality of optical cables are separated by the separator, the situation that the sealing effect is affected due to the gap between the optical cables caused by the contact between the optical cables is avoided, and the sealing effect of the sealing piece is further improved.

DESCRIPTION OF REFERENCE NUMERALS

Figure 1:
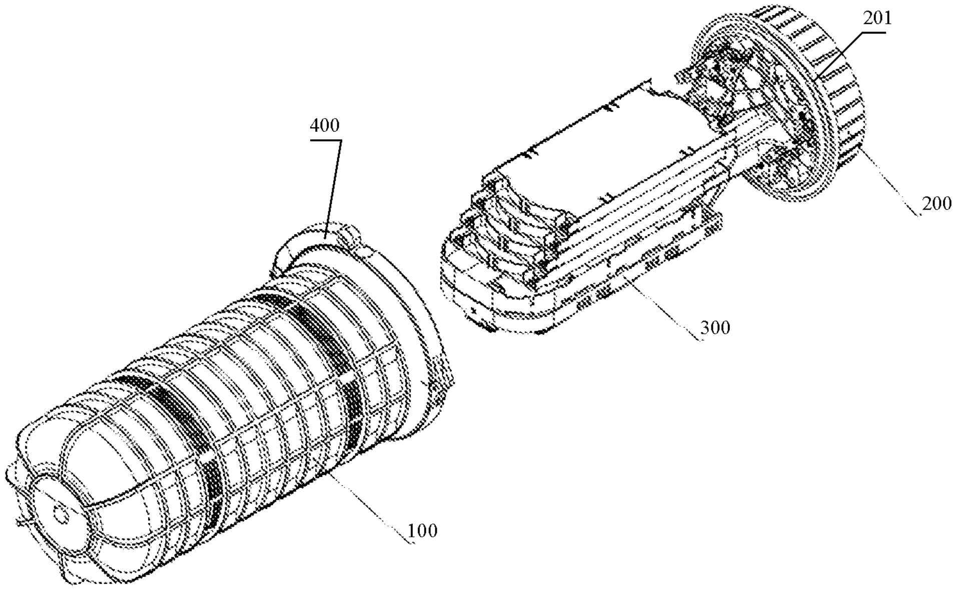
FIG. 1 is a schematic structural diagram of decomposition of an optical fiber splice closure in Embodiment 1 of the present disclosure.

100—closure cap; 110—first flange;

200—base; 201—second flange; 202—end cover; 204—sealing piece; 205—first pressing piece; 206—first press sheet; 207—second press sheet; 208—sealing block; 209—first sealing sheet; 210—first limiting column; 211—second limiting column; 212—second sealing sheet; 213—third limiting column; 214—fourth limiting column; 215—second pressing piece; 216—third press sheet; 217—fourth press sheet; 218—separator; 219—installation piece; 220—optical cable hole; 221—plug;

300—main body disc component; 310—supporting piece; 320—pedestal; 321—first support plate; 322—second support plate; 323—second hinging hole; 330—main body disc; 331—disc body; 332—installation protrusion; 340—connecting piece; 341—first pivot; 342—second pivot; 350—chassis;

400—anchor ear; 410—first holding piece; 420—limiting protrusion; 430—second holding piece; 440—buckle; 450—wrench;

510—base plate; 520—limiting stud; 530—limiting nut; and

600—cable.

DETAILED DESCRIPTION

In order to make objectives, technical solutions and advantages of embodiments of the present disclosure clearer, the technical solutions in the embodiments of the present disclosure will be clearly and completely described in the following with reference to accompanying drawings in the embodiments of the present disclosure. Apparently, the described embodiments are some rather than all of the embodiments of the present disclosure. The components of the embodiments of the present disclosure typically described and shown in the accompanying drawings may be arranged and designed in various different configurations.

Therefore, the detailed description of the embodiments of the present disclosure provided in the accompanying drawings is not intended to limit the scope of protection of the claimed present disclosure, but only to represent the selected embodiments of the present disclosure. Based on the embodiments in the present disclosure, all other embodiments obtained by those ordinarily skilled in the art without creative labor fall within the scope of protection of the present disclosure.

It should be noted that similar numerals and letters represent similar items in the following accompanying drawings. Therefore, once an item is defined in an accompanying drawing, it does not need to be further defined and explained in subsequent accompanying drawings.

In the description of the present disclosure, it should be noted that directional or positional relationships indicated by terms such as "center", "upper", "lower", "left", "right", "vertical", "horizontal", "inner" and "outer" are based on directional or positional relationships as shown in the accompanying drawings, or directional or positional relationships that are commonly placed when the invented product is used, and are only for the purposes of facilitating describing the present disclosure and simplifying the description, rather than indicating or implying that the referred apparatus or element has to have a specific direction or be constructed and operated in the specific direction, and therefore, they cannot be regarded as limitations to the present disclosure. In addition, the terms "first", "second" and "third" are only used to distinguish descriptions, and cannot be understood as indicating or implying relative importance.

In addition, the terms "horizontal", "vertical" and the like do not mean that the components are required to be absolutely horizontal or suspended, but may be slightly tilted. For example, "horizontal" only refers to its direction being more horizontal compared to "vertical", and it does not mean that the structure mush be completely horizontal, but may be slightly tilted.

In the description of the present disclosure, it should be noted that the terms "set", "installed", "connected" and "connection" should be understood in a broad sense unless otherwise specified and defined, for example, "connection" may be fixed connection or detachable connection or integrated connection, may be mechanical connection or electric connection, may be direct connection or indirect connection through an intermediate medium, and may be internal connection of two elements. For those ordinary skilled in the art, the specific meanings of the above terms in the present disclosure may be understood under specific situations.

Embodiment 1

Figure 2:
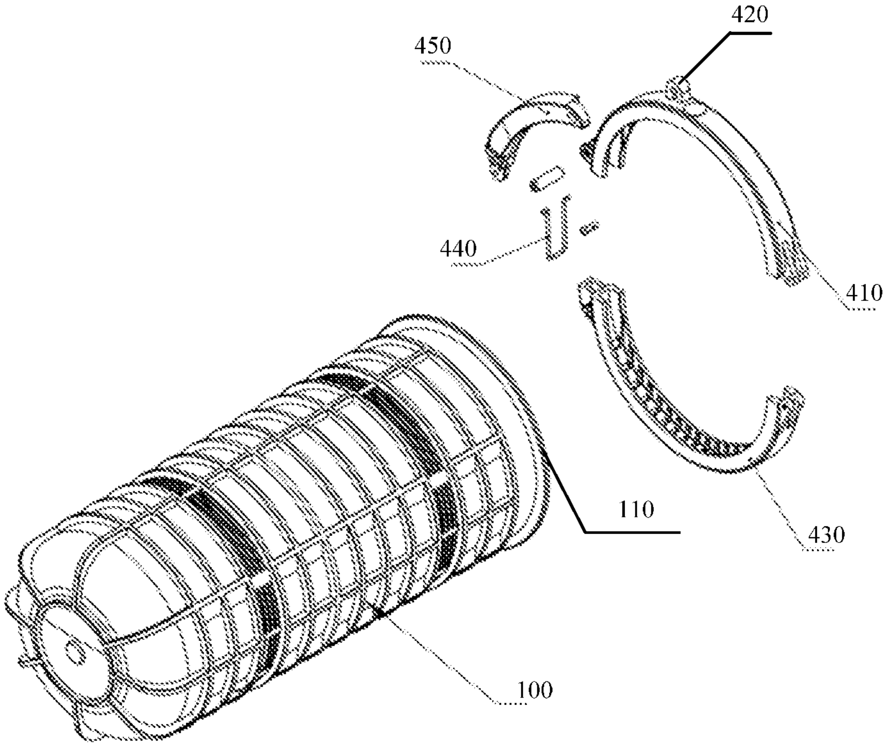
FIG. 2 is a schematic structural diagram of decomposition of a closure cap and an anchor ear of an optical fiber splice closure in Embodiment 1 of the present disclosure.
Figure 3:
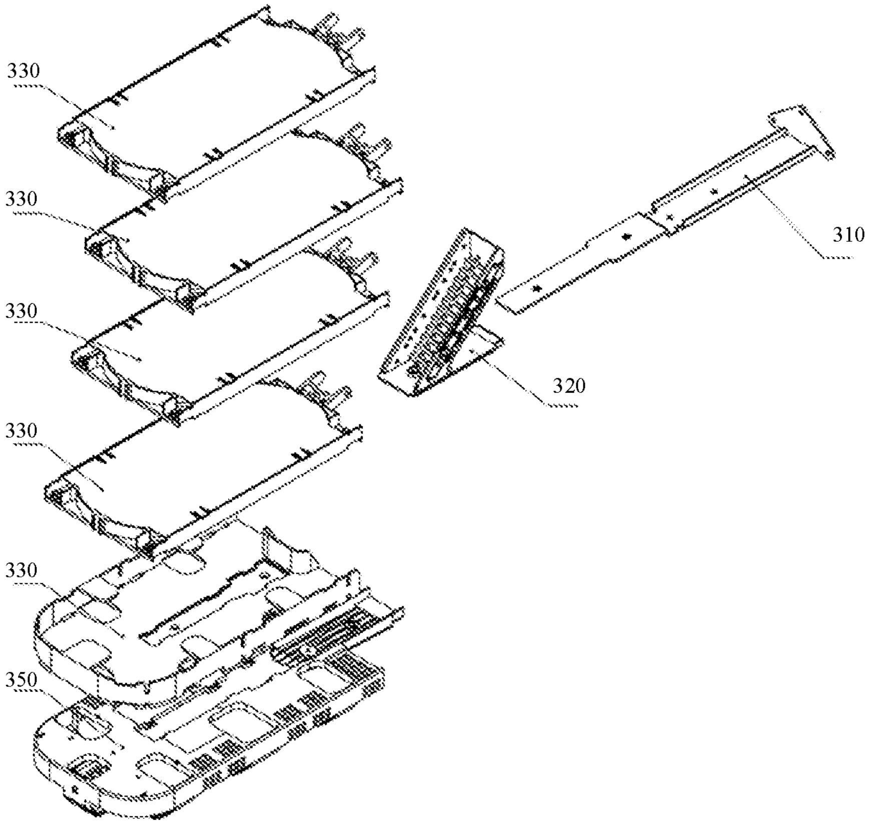
FIG. 3 is a schematic structural diagram of decomposition of a main body disc component of an optical fiber splice closure in Embodiment 1 of the present disclosure.
Figure 4:
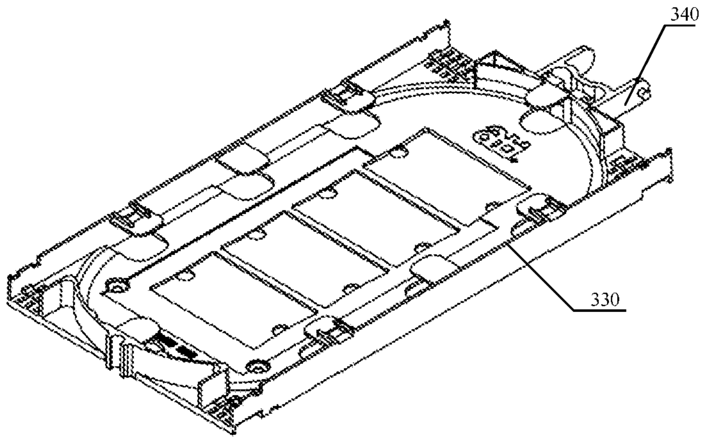
FIG. 4 is a schematic structural diagram of a viewing angle of a main body disc and a connecting piece of an optical fiber splice closure in Embodiment 1 of the present disclosure.
Figure 5:
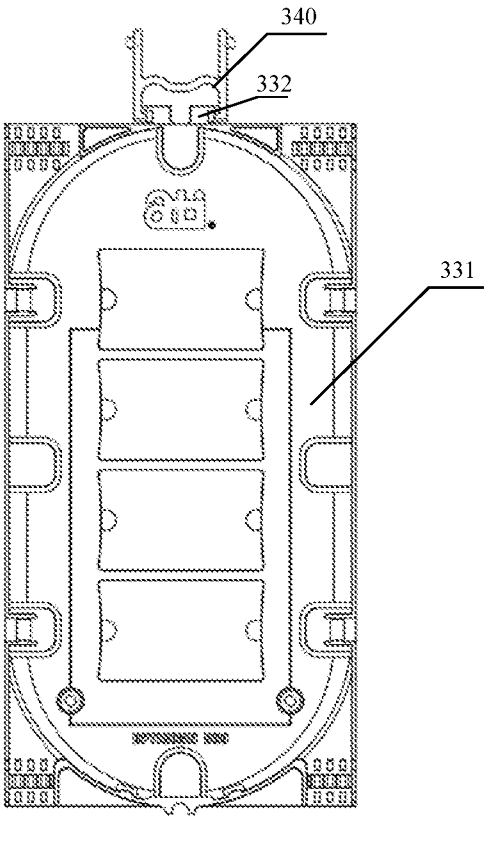
FIG. 5 is a schematic structural diagram of another viewing angle of a main body disc and a connecting piece of an optical fiber splice closure in Embodiment 1 of the present disclosure.
Figure 6:
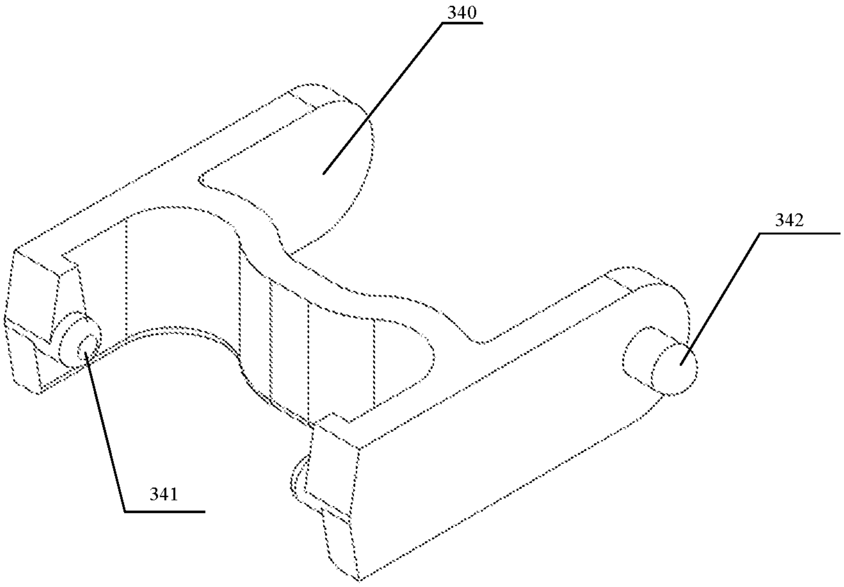
FIG. 6 is a schematic structural diagram of a connecting piece in an optical fiber splice closure in Embodiment 1 of the present disclosure.
Figure 7:
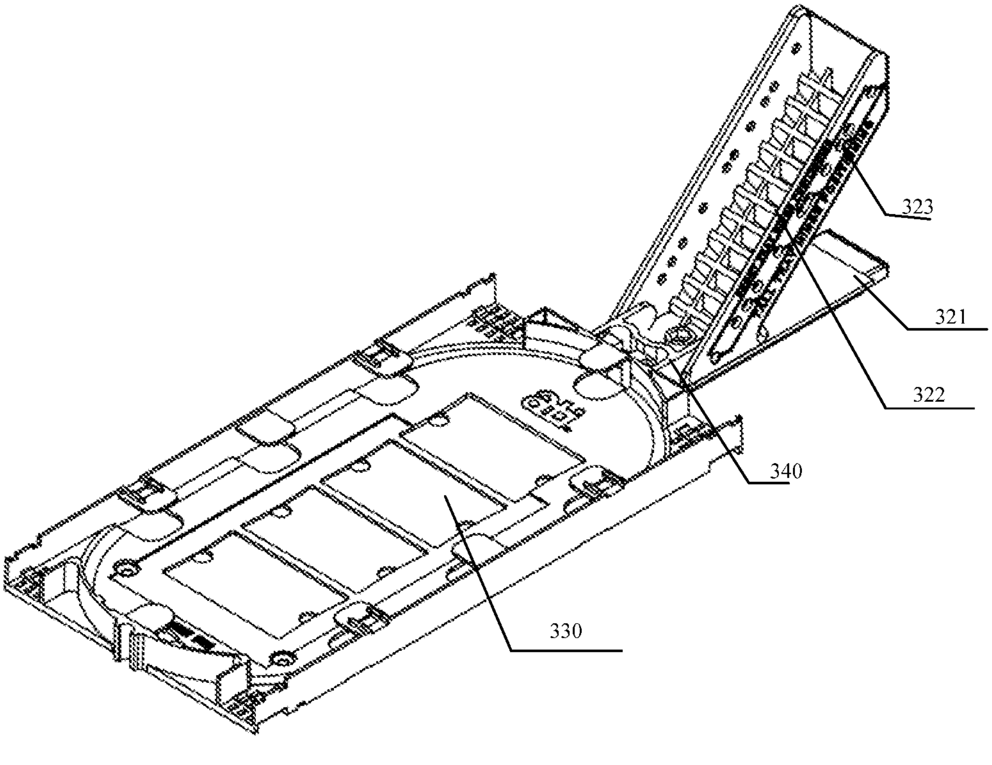
FIG. 7 is a schematic structural diagram of a main body disc being arranged on a pedestal through a connecting piece in an optical fiber splice closure in Embodiment 1 of the present disclosure.
Figure 8:
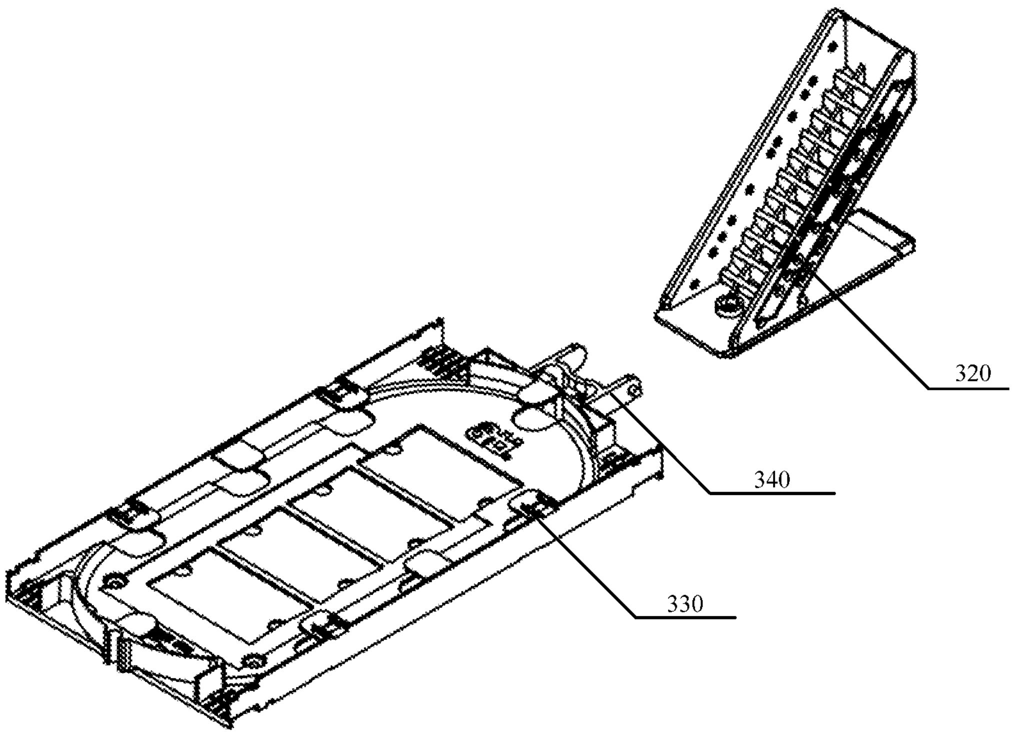
FIG. 8 is a schematic structural diagram of decomposition of a main body disc, a connecting piece and a pedestal in an optical fiber splice closure in Embodiment 1 of the present disclosure.

Referring to FIGS. 1-8, FIG. 1 is a schematic structural diagram of decomposition of an optical fiber splice closure in Embodiment 1 of the present disclosure, FIG. 2 is a schematic structural diagram of decomposition of a closure cap 100 and an anchor ear 400 of the optical fiber splice closure in Embodiment 1 of the present disclosure, FIG. 3 is a schematic structural diagram of decomposition of a main body disc component 300 of the optical fiber splice closure in Embodiment 1 of the present disclosure, FIG. 4 is a schematic structural diagram of a viewing angle of a main body disc 330 and a connecting piece 340 of the optical fiber splice closure in Embodiment 1 of the present disclosure, FIG. 5 is a schematic structural diagram of another viewing angle of the main body disc 330 and the connecting piece 340 of the optical fiber splice closure in Embodiment 1 of the present disclosure, FIG. 6 is a schematic structural diagram of the connecting piece 340 in the optical fiber splice closure in Embodiment 1 of the present disclosure, FIG. 7 is a schematic structural diagram of the main body disc 330 being arranged on a pedestal 320 through the connecting piece 340 in the optical fiber splice closure in Embodiment 1 of the present disclosure, and FIG. 8 is a schematic structural diagram of decomposition of the main body disc 330, the connecting piece 340 and the pedestal 320 in the optical fiber splice closure in Embodiment 1 of the present disclosure. The embodiment of the present disclosure provides an optical fiber splice closure, used for optical cable welding, and including: a closure cap 100, a base 200 and a main body disc component 300, the closure cap 100 and the base 200 form a sealed cavity, the main body disc component 300 is arranged in the sealed cavity, an optical cable penetrates through the base 200, enters the sealed cavity and then is divided into a plurality of optical fibers, the optical fibers of different optical cables are welded, and the main body disc component 300 is configured to accommodate the coiled optical fibers.

Referring to FIGS. 3-8, the main body disc component 300 includes a supporting piece 310, a pedestal 320, a main body disc 330 and a connecting piece 340, the supporting piece 310 is connected with the base 200, the pedestal 320 is arranged on the supporting piece 310, one end of the connecting piece 340 is connected with the pedestal 320, the main body disc 330 is connected with the other end of the connecting piece 340, and the main body disc 330 is configured to accommodate the coiled optical fibers.

Since the main body disc 330 is connected with the other end of the connecting piece 340, one end of the connecting piece 340 is connected with the pedestal 320, the supporting piece 310 is connected with the base 200, and the pedestal 320 is arranged on the supporting piece 310, the main body disc 330 may be connected to different pedestals 320 by setting different connecting pieces 340. Compared with the prior art where one main body disc 330 is fixedly connected with one connecting piece 340, which results in the main body disc 330 being only connected with a specific pedestal 320, the universality of the main body disc 330 can be improved.

Specifically, referring to FIGS. 4-6, the main body disc 330 includes a disc body 331 and an installation protrusion 332 extending outwards from the disc body 331, and the installation protrusion 332 is connected with the other end of the connecting piece 340 through a pin-jointed structure.

In this embodiment, a first hinging hole is formed in the installation protrusion 332, the other end of the connecting piece 340 is provided with a first pivot 341, and the first pivot 341 is matched with the first hinging hole. In other embodiments, the first pivot is arranged on the installation protrusion 332, the other end of the connecting piece is provided with the first hinging hole, and the first pivot is matched with the first hinging hole. In this way, the connecting piece 340 may rotate relative to the main body disc 330.

One end of the connecting piece 340 is provided with a second pivot 342, a second hinging hole 323 is formed in the pedestal 320, and the second pivot 342 is matched with the second hinging hole 323. In this way, the connecting piece 340 may rotate relative to the pedestal 320. In other embodiments, one end of the connecting piece 340 is provided with the second hinging hole 323, the second pivot 342 is arranged on the pedestal 320, and the second pivot 342 is matched with the second hinging hole 323.

Referring to FIGS. 1 and 7-8, the pedestal 320 is provided with a first support plate 321 and a second support plate 322 with a predetermined angle to the first support plate 321, the first support plate 321 is fixed to the supporting piece 310, the second support plate 322 is arranged on the first support plate 321, a plurality of second hinging holes 323 which are matched with the second pivot 342 are formed in the second support plate 322, the second hinging holes 323 are distributed in a length direction of the second support plate 322, such that a plurality of connecting pieces 340 which are connected with the second support plate 322 and a plurality of main body discs 330 are distributed in a stepped mode.

The main body disc component 300 further includes a chassis 350, the chassis 350 is arranged on the supporting piece 310, located at a bottom of the main body disc 330 and configured to accommodate the coiled optical fibers.

The main body disc 330 is fixedly connected with the chassis 350 through a fixing belt, for example, after the main body disc 330 and the pedestal 320 are fixed, and after the optical fibers are accommodated in the main body disc 330 and the chassis 350, the main body disc 330 may be bound to the chassis 350 through the fixing belt, so as to be fixed.

The optical fiber splice closure further includes a fixing component, which is configured to fix the closure cap 100 to the base 200. The fixing component may be an anchor ear 400.

Referring to FIG. 2, a first flange 110 is arranged on the closure cap 100, a second flange 201 is arranged on the base 200, the anchor ear 400 includes a first holding piece 410, a second holding piece 430, a buckle 440 and a wrench 450, the first holding piece 410 is hinged with the second holding piece 430, the first holding piece 410 and the second holding piece 430 are both in a semi-arc shape and have U-shaped cross sections, the U-shaped cross section of the first holding piece 410 clamps the first flange 110 and the second flange 201, the U-shaped cross section of the second holding piece 430 clamps the first flange 110 and the second flange 201, the wrench 450 is rotatably connected with the first holding piece 410, the buckle 440 is in a circular shape and is rotatably connected with one end, rotatably connected with the first holding piece 410, of the wrench 450, a locking protrusion is arranged on the second holding piece 430, after the buckle 440 is arranged on the locking protrusion in a sleeving mode, the wrench 450 is rotated to pull the second holding piece 430 to be close to the first holding piece 410 through the buckle 440, so that the first holding piece 410 and the second holding piece 430 are locked on the first flange 110 and the second flange 201.

Preferably, the wrench 450 is in an arc shape, after the first holding piece 410 and the second holding piece 430 are locked, an inner side of the wrench 450 is parallel to an outer side of the first holding piece 410, that is to say, the arc of the wrench 450 is in contact or be concentric with the arc of the first holding piece 410. In this way, after the first holding piece 410 and the second holding piece 430 are locked, the wrench 450 may be attached to the first holding piece 410, and a situation that the wrench 450 is touched by mistake, resulting in release of locking between the first holding piece 410 and the second holding piece 430 is avoided.

Further, referring to FIG. 2, a limiting protrusion 420 is further arranged on the first holding piece 410, a limiting hole is formed in the limiting protrusion 420, the wrench 450 is provided with a structural hole, the anchor ear 400 further includes a limiting pin, after the first holding piece 410 and the second holding piece 430 are locked, the limiting hole is aligned with the structural hole, and the limiting pin is inserted into the limiting hole and the structural hole. In this way, after the limiting pin is inserted into the limiting hole and the structural hole, the wrench 450 may be locked, and the wrench 450 is prevented from being touched by mistake to be released.

Embodiment 2

This embodiment provides an optical fiber splice closure, which differs from the optical fiber splice closure in Embodiment 1 in that the main body disc component 300 is different.

Figure 9:
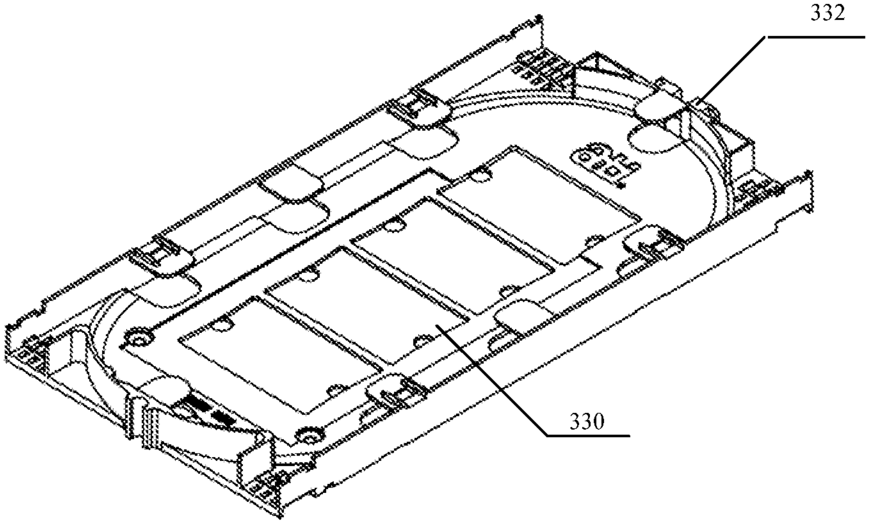
FIG. 9 is a schematic structural diagram of a main body disc in Embodiment 2 of the present disclosure.
Figure 10:
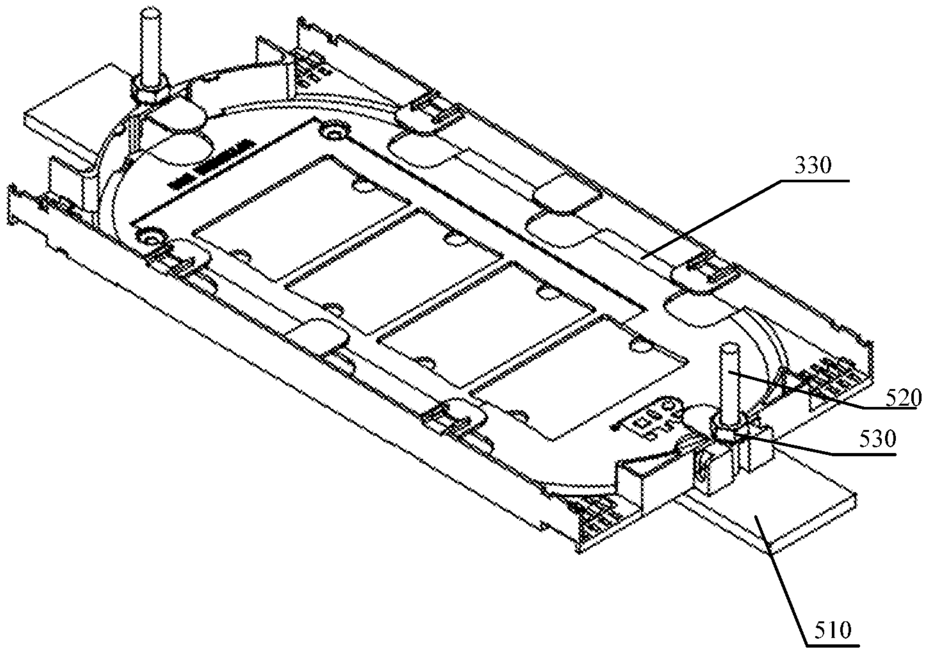
FIG. 10 is a schematic structural diagram of a main body disc component in Embodiment 2 of the present disclosure.
Figure 11:
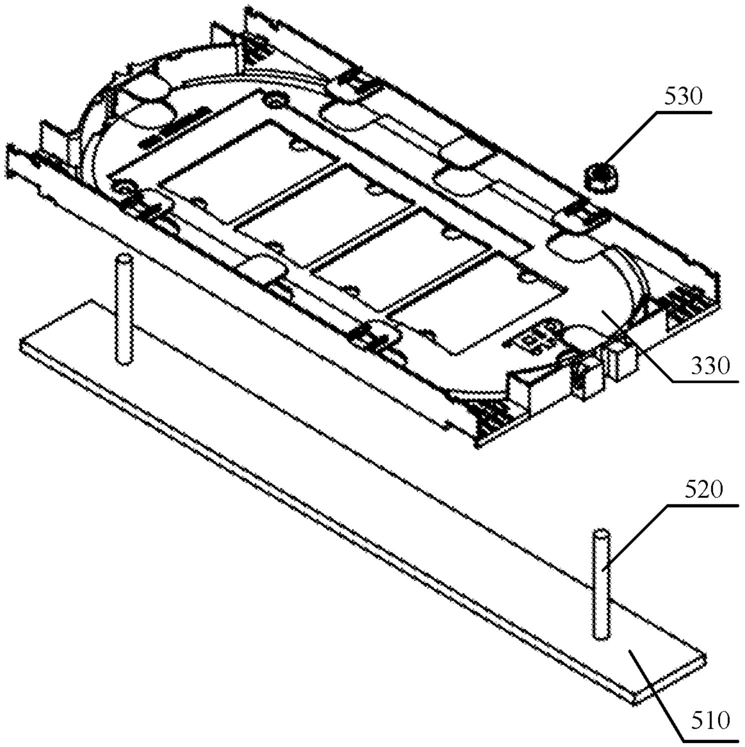
FIG. 11 is a schematic structural diagram of decomposition of a main body disc component in Embodiment 2 of the present disclosure.
Figure 12:
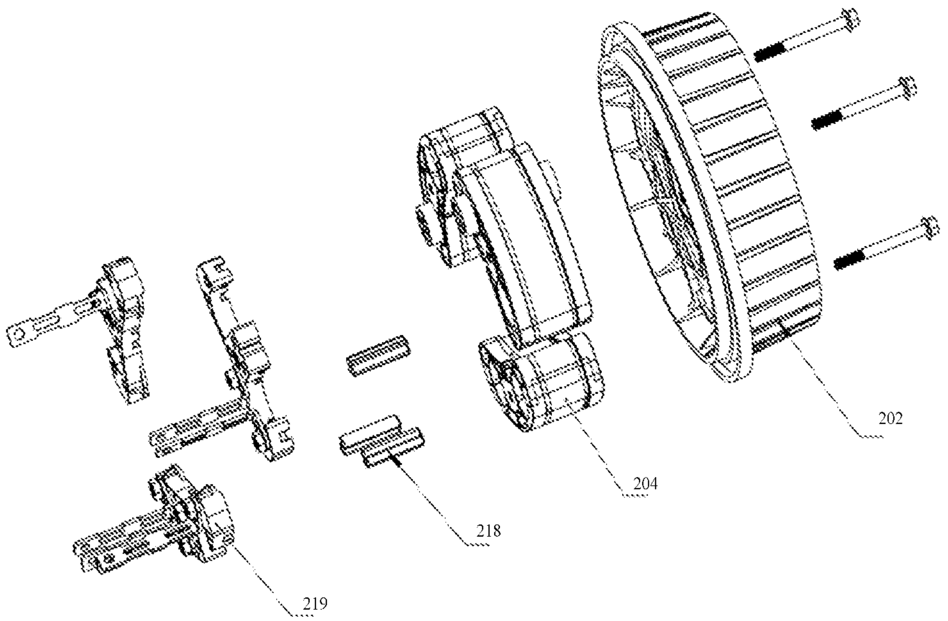
FIG. 12 is a schematic diagram of decomposition of a base in Embodiment 3 of the present disclosure.

Referring to FIGS. 9-11, FIG. 9 is a schematic structural diagram of a main body disc 330 in Embodiment 2 of the present disclosure, FIG. 10 is a schematic structural diagram of a main body disc component 300 in Embodiment 2 of the present disclosure, and FIG. 11 is a schematic structural diagram of decomposition of the main body disc component 300 in Embodiment 2 of the present disclosure. The main body disc component 300 includes a supporting piece 310, a base plate 510, a limiting stud 520, a main body disc 330 and a limiting nut 530, the supporting piece 310 is fixed to the base 200, the base plate 510 is fixed to the supporting piece 310, the limiting stud 530 is fixed to the base plate 510, the main body disc 330 includes a disc body 331 and an installation protrusion 332, the installation protrusion 332 is provided with a U-shaped groove, and the limiting stud 520 penetrates through the U-shaped groove from a bottom of the main body disc 330 to be fixedly connected with the limiting nut 530. The limiting stud 520 is connected with the limiting nut 530 to press the main body disc 330 on the base plate 510 tightly, a plurality of main body discs 330 may be arranged between the limiting stud 520 and the limiting nut 530, in this way, the plurality of main body discs 330 may be installed on the base plate 510, so as to be fixed to the supporting piece 310.

The structure of the main body disc 330 in this embodiment is the same as the structure of the main body disc 330 in Embodiment 1. This embodiment provides a new structure that fixes the main body disc 330 to the supporting piece 310.

Embodiment 3

This embodiment provides an optical fiber splice closure, and the structure of the base 200 in the optical fiber splice closure in Embodiment 1 is specifically described in details.

Figure 13:
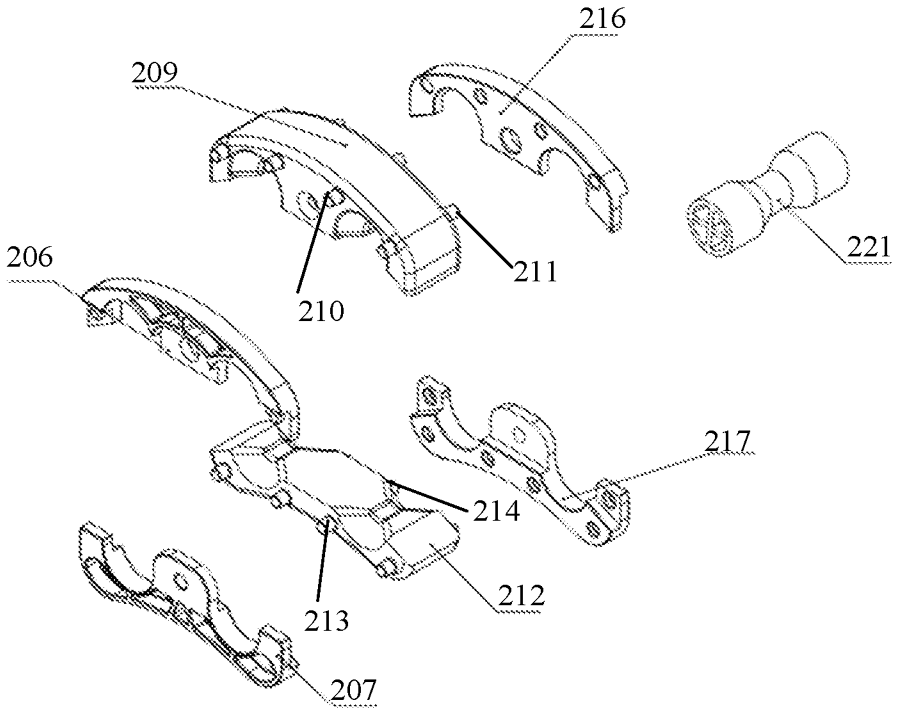
FIG. 13 is a schematic diagram of decomposition of a sealing component in Embodiment 3 of the present disclosure.
Figure 14:
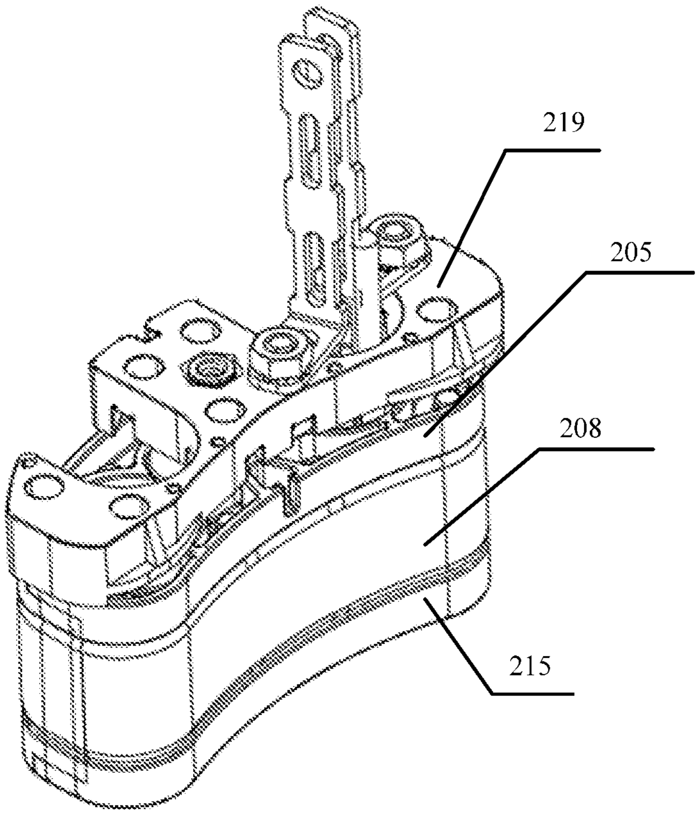
FIG. 14 is a schematic three-dimensional structural diagram of a sealing component in Embodiment 3 of the present disclosure.
Figure 15:
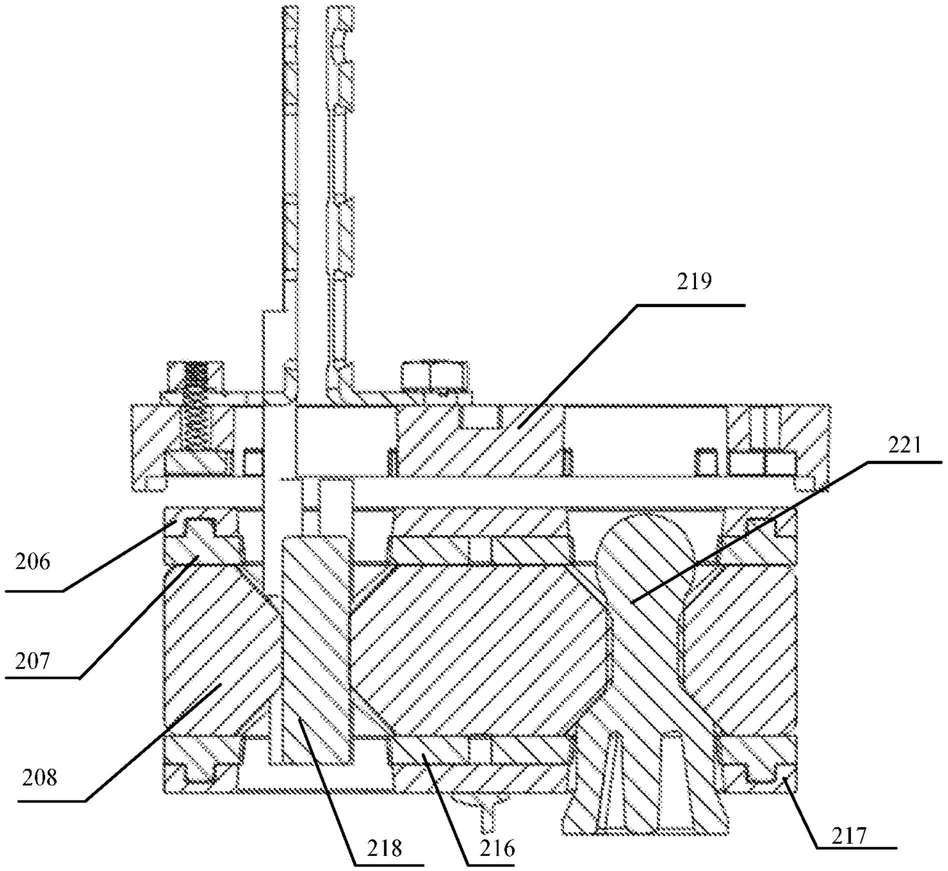
FIG. 15 is a schematic cross-sectional view of a sealing component in Embodiment 3 of the present disclosure.
Figure 16:
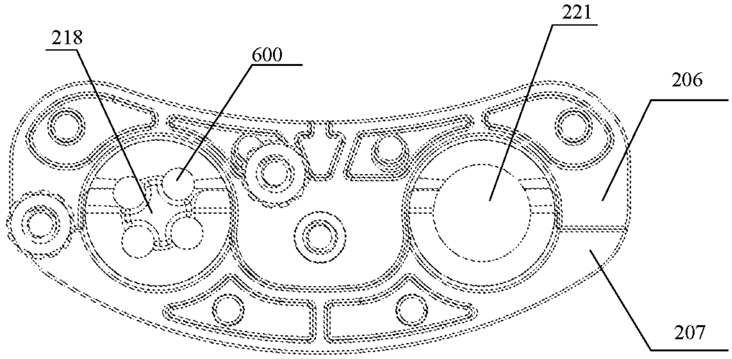
FIG. 16 is a schematic top view of a sealing component in Embodiment 3 of the present disclosure.
Figure 17:
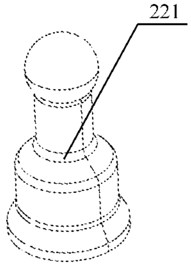
FIG. 17 is a schematic structural diagram of a plug in a sealing component in Embodiment 3 of the present disclosure.
Figure 18:
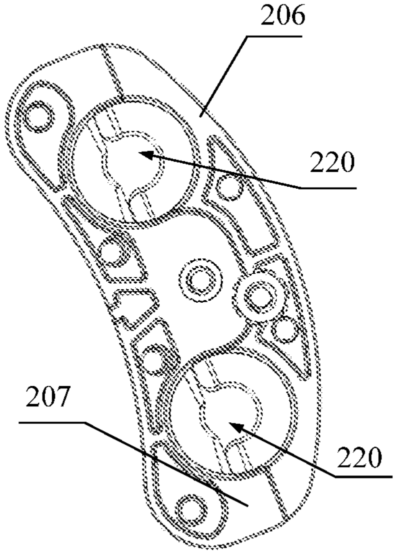
FIG. 18 is a schematic top view after removing a plug from a sealing component in Embodiment 3 of the present disclosure.

Referring to FIGS. 12-18, FIG. 12 is a schematic diagram of decomposition of a base 200 in Embodiment 3 of the present disclosure, FIG. 13 is a schematic diagram of decomposition of a sealing component in Embodiment 3 of the present disclosure, FIG. 14 is a schematic three-dimensional structural diagram of the sealing component in Embodiment 3 of the present disclosure, FIG. 15 is a schematic cross-sectional view of the sealing component in Embodiment 3 of the present disclosure, FIG. 16 is a schematic top view of the sealing component in Embodiment 3 of the present disclosure, FIG. 17 is a schematic structural diagram of a plug 221 in the sealing component in Embodiment 3 of the present disclosure, and FIG. 18 is a schematic top view after removing a plug 221, an optical cable 600 and a separator 218 from the sealing component in Embodiment 3 of the present disclosure. This embodiment provides an optical fiber splice closure, used for optical cable welding, and including a closure cap 100 and a base 200, the base 200 includes an end cover 202 and a sealing component, the end cover 202 and the closure cap 100 are connected to form a sealed cavity, an installation groove is formed in the end cover 202, a through hole communicating with the sealed cavity is formed in a bottom of the installation groove, the sealing component includes a sealing piece 204, a separator 218 and an installation piece 219, the sealing piece 204 includes a first pressing piece 205, a sealing block 208 and a second pressing piece 215, the first pressing piece 205, the sealing block 208 and the second pressing piece 215 are provided with a first installation hole, a second installation hole and a third installation hole respectively, the first installation hole, the second installation hole and the third installation hole communicate with one another in sequence to form an optical cable hole 220, a plurality of optical cables penetrate through the optical cable hole 220 and the through hole and enter the sealed cavity, the separator 218 is arranged in the optical cable hole 220 and configured to separate the plurality of optical cables from one another, the sealing piece 204 is arranged in the installation groove, the first pressing piece 205 is in contact with the bottom of the installation groove, the installation piece 219 located in the sealed cavity is configured to fix the sealing piece 204 and the separator 218 to the end cover 202, and a material of the sealing block 208 is gel.

Since the sealing piece 204 includes the first pressing piece 205, the sealing block 208 and the second pressing piece 215, the first pressing piece 205, the sealing block 208 and the second pressing piece 215 are provided with the first installation hole, the second installation hole and the third installation hole respectively, the first installation hole, the second installation hole and the third installation hole communicate with one another in sequence to form the optical cable hole 220, the plurality of optical cables penetrate through the optical cable hole 220 and the through hole and enter the sealed cavity, the separator 218 is arranged in the optical cable hole 220 and configured to separate the plurality of optical cables from one another, the sealing piece 204 is located in the installation groove, the first pressing piece 205 is in contact with the bottom of the installation groove, the installation piece 219 located in the sealed cavity is configured to fix the sealing piece 204 and the separator 218 to the end cover 202, and the material of the sealing block 208 is the gel, after the sealing piece 204 is arranged in the installation groove, and the first pressing piece 205 is in contact with the bottom of the installation groove, the sealing block 208 may be pressed by the installation piece 219, the first pressing piece 205 and the second pressing piece 215, so that the sealing block 208 deforms to fill a gap between the sealing piece 204 and the installation groove and a gap between the optical cable and the separator 218, so that a better sealing effect is achieved. Since the plurality of optical cables are separated by the separator 218, a situation that the sealing effect is affected due to the gap between the optical cables caused by the contact between the optical cables is avoided, and the sealing effect of the sealing piece 204 is further improved.

Figure 19:
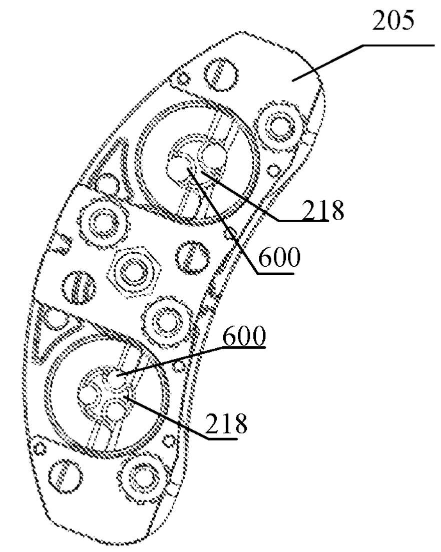
FIG. 19 is a schematic top view of a sealing component in other embodiments of the present disclosure.
Figure 20:
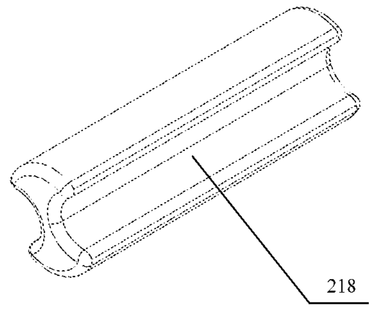
FIG. 20 is a schematic structural diagram of a separator in other embodiments of the present disclosure.
Figure 21:
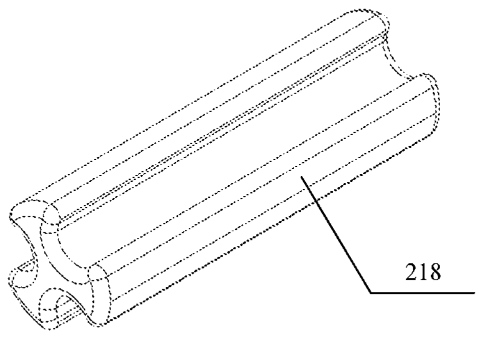
FIG. 21 is a schematic structural diagram of another separator in other embodiments of the present disclosure.

In this embodiment, the separator 218 may separate four optical cables. In other embodiments, as shown in FIG. 19, FIG. 20 and FIG. 21, FIG. 19 is a schematic top view of a sealing component in other embodiments of the present disclosure, FIG. 20 is a schematic structural diagram of a separator 218 in other embodiments of the present disclosure, and FIG. 21 is a schematic structural diagram of another separator 218 in other embodiments of the present disclosure. The separator 218 may separate two, three or more optical cables.

Referring to FIG. 13, the first pressing piece 205 includes a first press sheet 206 and a second press sheet 207, the sealing block 208 includes a first sealing sheet 209 and a second sealing sheet 212, the second pressing piece 215 includes a third press sheet 216 and a fourth press sheet 217, the first press sheet 206 and the second press sheet 217 are enclosed into the first installation hole, the first sealing sheet 209 and the second sealing sheet 212 are enclosed into the second installation hole, and the third press sheet 216 and the fourth press sheet 217 are enclosed into the third installation hole. The first pressing piece 205, the sealing block 208 and the second pressing piece 215 are arranged into two separate components, which may be convenient for clamping the optical cables to install them conveniently.

Referring to FIG. 13, a first limiting column 210 and a second limiting column 211 extend on two sides of the first sealing sheet 209, a third limiting column 213 and a fourth limiting column 214 extend on two sides of the second sealing sheet 212, a first fixing hole matched with the first limiting column 210 is formed in the first press sheet 206, a second fixing hole matched with the second limiting column 211 is formed in the third press sheet 216, a third fixing hole matched with the third limiting column 213 is formed in the second press sheet 207, and a fourth fixing hole matched with the fourth limiting column 214 is formed in the fourth press sheet 217. The first fixing hole is matched with the first limiting column 210, the second fixing hole is matched with the second limiting column 211, the third fixing hole is matched with the third limiting column 213, and the fourth fixing hole is matched with the fourth limiting column 214, so that movement of the first sealing sheet 209 and the second sealing sheet 212 relative to the first press sheet 206 and the second press sheet 207, as well as the third press sheet 216 and the fourth press sheet 217 is avoided, and thus a better sealing effect is achieved.

Materials of the first pressing piece 205, the second pressing piece 215 and the separator 218 are plastics.

There is a plurality of first installation holes, second installation holes and third installation holes. The sealing piece 204 further includes a plug 221, which is configured to block the optical cable hole 220 through which no optical cable penetrates.

When the optical fiber splice closure is installed, firstly, the first sealing sheet 209 and the second sealing sheet 212 are spliced and sleeve the optical cables, the separator 218 and the plug 221 are arranged in the corresponding second installation holes, so as to separate the corresponding optical cables; then, the first press sheet 206 and the second press sheet 207, as well as the third press sheet 216 and the fourth press sheet 217 are spliced respectively, the first press sheet 206 and the second press sheet 207, as well as the third press sheet 216 and the fourth press sheet 217 are pressed on two side surfaces of the first sealing sheet 209 and the second sealing sheet 212 respectively, the first fixing hole is matched with the first limiting column 210, the second fixing hole is matched with the second limiting column 211, the third fixing hole is matched with the third limiting column 213, and the fourth fixing hole is matched with the fourth limiting column 214, so that assembly of the sealing piece 204 is completed; then, the sealing piece 204 is installed into the installation groove of the end cover 202 through the installation piece 219, the first press sheet 206 and the second press sheet 207 are in contact with the bottom of the installation groove, so that sealing of the optical cables and sealing of the installation groove are achieved, and assembly of the base 200 is completed; and then, the closure cap 100 is fixedly arranged on the base 200.

The above description is only a description of the preferred embodiments of the present disclosure and does not limit the scope of the present disclosure. Any changes or modifications made by those ordinarily skilled in the art of the present disclosure based on the disclosed content belong to the scope of protection of the claims.

What is claimed is:

1. An optical fiber splice closure, used for optical cable welding, comprising: a closure cap and a base, wherein the base comprises an end cover and a sealing component, the end cover and the closure cap are connected to form a sealed cavity, an installation groove is formed in the end cover, a through hole communicating with the sealed cavity is formed in a bottom of the installation groove, the sealing component comprises a sealing piece, a separator and an installation piece, the sealing piece comprises a first pressing piece, a sealing block and a second pressing piece, the first pressing piece, the sealing block and the second pressing piece are provided with a first installation hole, a second installation hole and a third installation hole respectively, the first installation hole, the second installation hole and the third installation hole communicate with one another in sequence to form an optical cable hole, a plurality of optical cables penetrate through the optical cable hole and the through hole and enter the sealed cavity, the separator is arranged in the optical cable hole and configured to separate the plurality of optical cables from one another, the sealing piece is arranged in the installation groove, the first pressing piece is in contact with the bottom of the installation groove, the installation piece located in the sealed cavity is configured to fix the sealing piece and the separator to the end cover, and a material of the sealing block is gel.

2. The optical fiber splice closure of claim 1, wherein the first pressing piece comprises a first press sheet and a second press sheet, the sealing block comprises a first sealing sheet and a second sealing sheet, the second pressing piece comprises a third press sheet and a fourth press sheet, the first press sheet and the second press sheet are enclosed into the first installation hole, the first sealing sheet and the second sealing sheet are enclosed into the second installation hole, and the third press sheet and the fourth press sheet are enclosed into the third installation hole.

3. The optical fiber splice closure of claim 2, wherein a first limiting column and a second limiting column extend on two sides of the first sealing sheet, a third limiting column and a fourth limiting column extend on two sides of the second sealing sheet, a first fixing hole matched with the first limiting column is formed in the first press sheet, a second fixing hole matched with the second limiting column is formed in the third press sheet, a third fixing hole matched with the third limiting column is formed in the second press sheet, and a fourth fixing hole matched with the fourth limiting column is formed in the fourth press sheet.

4. The optical fiber splice closure of claim 1, wherein materials of the first pressing piece, the second pressing piece and the separator are plastics.

5. The optical fiber splice closure of claim 1, wherein a plurality of first installation holes, second installation holes and third installation holes are formed.

6. The optical fiber splice closure of claim 1, wherein the sealing piece further comprises a plug, which is configured to block an optical cable hole through which no optical cable penetrates.

7. The optical fiber splice closure of claim 1, further comprising an anchor ear, wherein a first flange is arranged on the closure cap, a second flange is arranged on the base, the anchor ear comprises a first holding piece, a second holding piece, a buckle and a wrench, the first holding piece is hinged with the second holding piece, the first holding piece and the second holding piece are both in a semi-arc shape and have U-shaped cross sections, the U-shaped cross section of the first holding piece clamps the first flange and the second flange, the U-shaped cross section of the second holding piece clamps the first flange and the second flange, the wrench is rotatably connected with the first holding piece, the buckle is rotatably connected with one end, rotatably connected with the first holding piece, of the wrench, a locking protrusion is arranged on the second holding piece, after the buckle is arranged on the locking protrusion in a sleeving mode, the wrench is rotated to pull the second holding piece to be close to the first holding piece through the buckle, so that the first holding piece and the second holding piece are locked on the first flange and the second flange.

8. The optical fiber splice closure of claim 7, wherein the wrench is in an arc shape, and after the first holding piece and the second holding piece are locked, an inner side of the wrench is parallel to an outer side of the first holding piece.

9. The optical fiber splice closure of claim 8, wherein a limiting protrusion is further arranged on the first holding piece, a limiting hole is formed in the limiting protrusion, the wrench is provided with a structural hole, the anchor ear further comprises a limiting pin, after the first holding piece and the second holding piece are locked, the limiting hole is aligned with the structural hole, and the limiting pin is inserted into the limiting hole and the structural hole.

* * * * *